US008929710B2

(12) United States Patent  
Fitzsimmons

(10) Patent No.: US 8,929,710 B2
(45) Date of Patent: Jan. 6, 2015

(54) SYSTEM AND METHOD FOR TIME SHIFTING AT LEAST A PORTION OF A VIDEO PROGRAM

(76) Inventor: Todd E. Fitzsimmons, Long Beach, CA (US)

(*) Notice: Subject to any disclaimer, the term of this patent is extended or adjusted under 35 U.S.C. 154(b) by 364 days.

(21) Appl. No.: 13/279,943

(22) Filed: Oct. 24, 2011

(65) Prior Publication Data

US 2012/0106920 A1 May 3, 2012

Related U.S. Application Data

(60) Provisional application No. 61/408,759, filed on Nov. 1, 2010.

(51) Int. Cl.
| H04N 5/775 | (2006.01) |
| H04N 5/783 | (2006.01) |
| H04N 21/4147 | (2011.01) |
| G11B 27/10 | (2006.01) |
| H04N 21/426 | (2011.01) |
| H04N 21/431 | (2011.01) |
| H04N 21/432 | (2011.01) |
| H04N 21/443 | (2011.01) |
| H04N 21/462 | (2011.01) |
| H04N 21/81 | (2011.01) |
| H04N 21/845 | (2011.01) |

(52) U.S. Cl.
CPC .............. *H04N 5/775* (2013.01); *H04N 5/783* (2013.01); *H04N 21/4147* (2013.01); *G11B 27/105* (2013.01); *H04N 21/4263* (2013.01); *H04N 21/4316* (2013.01); *H04N 21/4325* (2013.01); *H04N 21/4438* (2013.01); *H04N 21/4622* (2013.01); *H04N 21/812* (2013.01); *H04N 21/8126* (2013.01); *H04N 21/8456* (2013.01)
USPC .......................................................... 386/230

(58) Field of Classification Search
CPC ....... H04N 5/775; H04N 5/85; H04N 9/8042; G11B 27/34; G11B 27/105
See application file for complete search history.

(56) References Cited

U.S. PATENT DOCUMENTS

| 7,634,785 | B2* | 12/2009 | Smith | 725/34 |
| 2008/0319852 | A1* | 12/2008 | Gardner et al. | 705/14 |
| 2009/0238536 | A1* | 9/2009 | Gratton | 386/54 |
| 2011/0221964 | A1* | 9/2011 | Harris | 348/569 |

* cited by examiner

*Primary Examiner* — William C Vaughn, Jr.
*Assistant Examiner* — Daniel Tekle
(74) *Attorney, Agent, or Firm* — Todd E. Fitzsimmons

(57) ABSTRACT

A system and method is provided for time shifting a video program. In one embodiment, a receiver, which may be configured to function as both a receiver and a DVR, is configured to add auxiliary data to time-shifted data. The receiving device is configured to acquire auxiliary data at the time the time-shifted data is being played, and to add the auxiliary data to the time-shifted data so that both the time-shifted data and the auxiliary data are displayed to a user on a display. By acquiring data at (or around) the time the time-shifted data is being played, it is more likely that the auxiliary data has value to the user, thereby increasing the value of the time-shifted data to the content owner, the content provider and advertiser. In an alternate embodiment, the auxiliary data is removed only after its value has diminished.

19 Claims, 4 Drawing Sheets

SYSTEM AND METHOD FOR TIME SHIFTING AT LEAST A PORTION OF A VIDEO PROGRAM

CROSS-REFERENCE TO RELATED APPLICATION

This application claims the benefit pursuant to 35 U.S.C. §119(e) of U.S. Provisional Patent Application No. 61/408,759 filed Nov. 1, 2010, which application is specifically incorporated herein, in its entirety, by reference.

BACKGROUND OF THE INVENTION

1. Field of the Invention

The present invention relates to the storage and play back of time-shifted data, and more particularly to a system and method for adding auxiliary data to data that has been time-shifted.

2. Description of Related Art

Digital video recorders ("DVRs"), like TIVO™, are commonly used to record data (e.g., video, audio, etc.), allowing it to be played back at a later time. This concept is referred to as time-shifting, in that it allows the recorded data (in its original form) to be played back at a later time. For example, a television program that airs at 2:05 in the morning can be recorded and played back at a more convenient time (e.g., the following day at 1:00 in the afternoon).

The concept of time-shifting is advantageous to the user in that it allows the user to watch a television program at a more convenient time. Such a concept is also advantageous to an owner and a distributor of the program (i.e., content owner and content provider, respectively) in that it increases (or has the potential to increase) viewership, or the number of viewers of the program. In other words, by allowing a person to watch a television program at a time that is convenient to them, it increases the likelihood that the person will watch the program, especially if the program is being broadcasted at an inconvenient time (e.g., while other popular programs are being broadcasted, while the person is working, while the person is sleeping, etc.).

DVRs are also popular in that they allow a user to pause, rewind or fast forward a television program. Thus, the user can re-watch the program (or a portion thereof), or skip a portion of the program. This creates a problem for the content owner and/or the content provider in that it allows the user to skip commercials, or paid advertisements, which can decrease the value of the program to the content owner, the content provider and advertisers.

It also creates another problem in that the information that's included in the program may be outdated. For example, a program may include an advertisement for a movie that is currently being shown at a local theater. If, however, the user does not watch the program for several weeks, that movie may no longer be playing at the local theater. By way of another example, the program may include information at the bottom of the screen (e.g., news ticker or "crawler"), identifying upcoming programs, late-breaking news, scores of daily sporting events, etc. Obviously, if the user does not watch the program for several weeks, this information is outdated, and of little value.

This problem originates from the fact that this type of information (e.g., advertisements, news tickers, "crawlers," etc.) is selected based on when the program is being broadcasted, and not on when the program is being viewed. For example, if a program is being broadcasted on a Monday afternoon, then it may include commercials directed toward mothers, or individuals who are home on Monday afternoon. Similarly, if a program is being broadcasted on a sports channel on Sunday night, then it may include a news ticker on scores for sporting events that took place earlier that day.

With more and more data being time-shifted, it would be advantageous to develop a system and method of adding data (e.g., auxiliary data) to time-shifted data at the time the data is being played. By doing this, data can be added that is current, and therefore more likely to be of value to the user, which can increase the value of the program to the content owner, the content provider and advertisers.

SUMMARY OF THE INVENTION

The present invention provides a system and method for adding auxiliary data (e.g., advertisements, news tickers, "crawlers," etc.) to data that has been time-shifted. Preferred embodiments of the present invention operate in accordance with a data transmission system, wherein data (e.g., movies and television programs, including sitcoms, sporting events, news programs, etc.) is being transmitted from at least one data source (e.g., content owner, content provider, etc.) to at least one receiving device (e.g., set-top box, television, etc.) via at least one data distribution means (e.g., satellite, cable, fiber-optics, telephone line, etc.). Data is provided to the receiving device via a first transmission path, where it is processed and provided to a display via a second transmission path, which may include, for example, a coaxial cable, an HDMI cable, RCA cables, an Ethernet cable or other wireless means (e.g., WiFi, Bluetooth, etc.).

In a preferred embodiment of the present invention, the receiving device is configured to function as a DVR. In other words, the receiving device is configured to perform both standard receiver functions and standard DVR functions. In this embodiment, the receiving device is also configured to add auxiliary data to data that is being time-shifted, or data that has been recorded and is being played back. In other words, at the time the time-shifted data is being played, the receiver may be configured to acquire auxiliary data, and insert the auxiliary data into the time-shifted data, so that both the time-shifted data and the auxiliary data are displayed to the user on the display. By acquiring auxiliary data at (or around) the time the time-shifted data is being played, it is more likely that the auxiliary data has value to the user, thereby increasing the value of the time-shifted data to the content owner, the content provider and advertisers.

In one embodiment of the present invention, the time-shifted data may be displayed in a main portion of the display, and the auxiliary data may be displayed in a secondary (or auxiliary) portion of the display. For example, in the case of a sitcom, the sitcom may be shown in the main portion, and auxiliary information, such as information on upcoming programs, late-breaking news, the content owner, the content provider or an advertiser, may be shown in the secondary portion.

In another embodiment of the present invention, the time-shifted data is broken down into a plurality of segments, and auxiliary data is added between the individual segments. For example, time-shifted data, which may be a sitcom, may be broken down into three segments. The receiving device may be configured to store the segments separately, and play the first segment in response to a corresponding command. The receiving device may further be configured to receive auxiliary data when the first segment is played (or is substantially over) and to play the auxiliary data when the first segment is over. The receiving device would then play the second segment, followed by a second set of auxiliary data, followed by the third segment, etc.

In another embodiment of the present invention, a system for adding auxiliary data to time-shifted data includes a controller in communication with a remote control, a processor and at least one tuner, wherein the tuner is configured to receive data on at least one channel from an antenna, and to access data on a particular channel, as selected by either the controller or the processor. Data received by the tuner is then provided to a decoder, where the data is processed and provided to the processor. The processed data can then either be displayed on the display or stored in memory, so that it can be displayed at a future time.

In another embodiment of the present invention, a method for adding auxiliary data to time-shifted data includes the recording of program data. When the program data is played, auxiliary data is retrieved. This can be, for example, in response to a request to play the program data, in response to accessing program data from memory, in response to playing program data. etc. Both auxiliary data and program data are then played at the same time on the display (e.g., as PIP, POP, etc.). In an alternate embodiment, the program data is split into a plurality of segments, and auxiliary data is played between segments. The playing of both program data and auxiliary data (either consecutively or concurrently) continues until the program data is over.

A more complete understanding of the system and method for inserting auxiliary data into time-shifted data will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Figure 1:
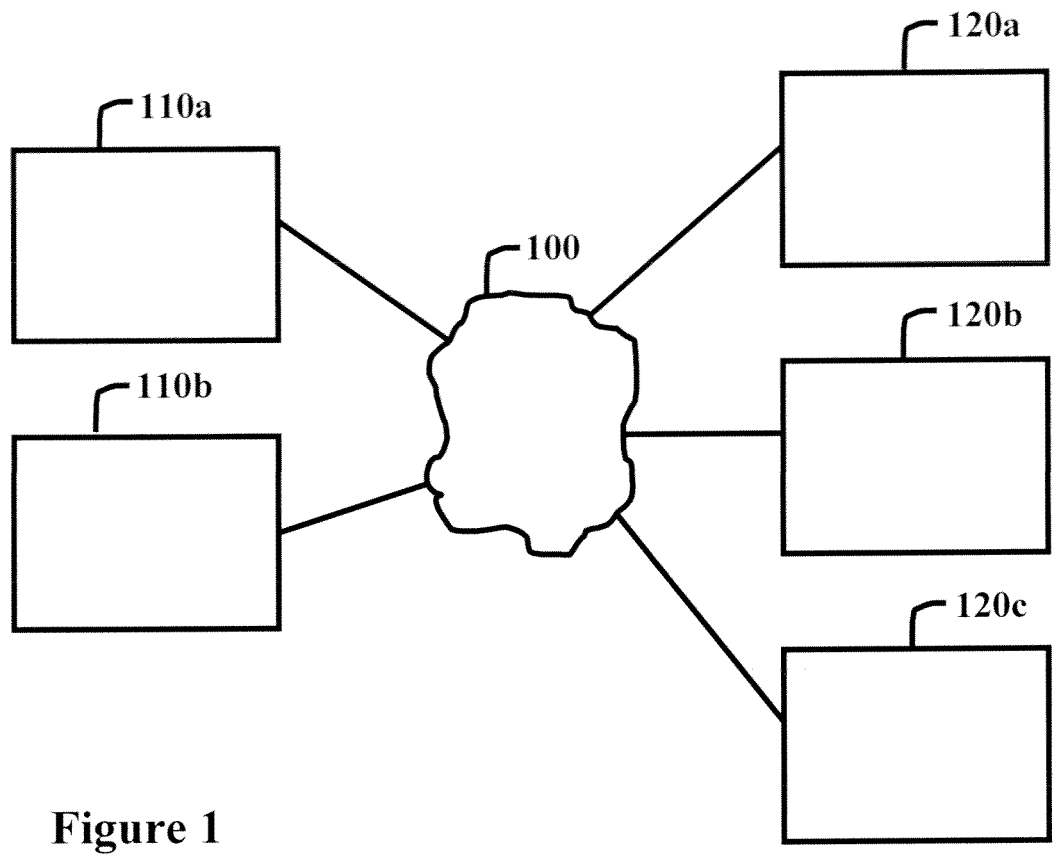
FIG. 1 illustrates a data transmission system in accordance with a preferred embodiment of the present invention.

The present invention provides a system and method for adding auxiliary data (e.g., advertisements, news tickers, "crawlers," etc.) to data that is being time-shifted. As shown in FIG. 1, preferred embodiments of the present invention operate in accordance with a data transmission system, wherein data (e.g., movies and television programs, including sitcoms, sporting events, news programs, etc.) is being transmitted from at least one data source 110a, 110b (e.g., content owner, content provider, etc.) to at least one receiving device 120a, 120b and 120c (e.g., set-top box, television, etc.) via at least one data distribution means 100 (e.g., satellite, cable, fiber-optics, telephone line, etc.). Thus, for example, the transmission of data from DIRECTV™ or DISH™ to a satellite receiver via at least one satellite is within the spirit and scope of the present invention. By way of another example, the transmission of data from Time Warner™ or Charter™ to a cable box via a cable, fiber-optic or wide area network is also within the spirit and scope of the present invention.

Figure 2:
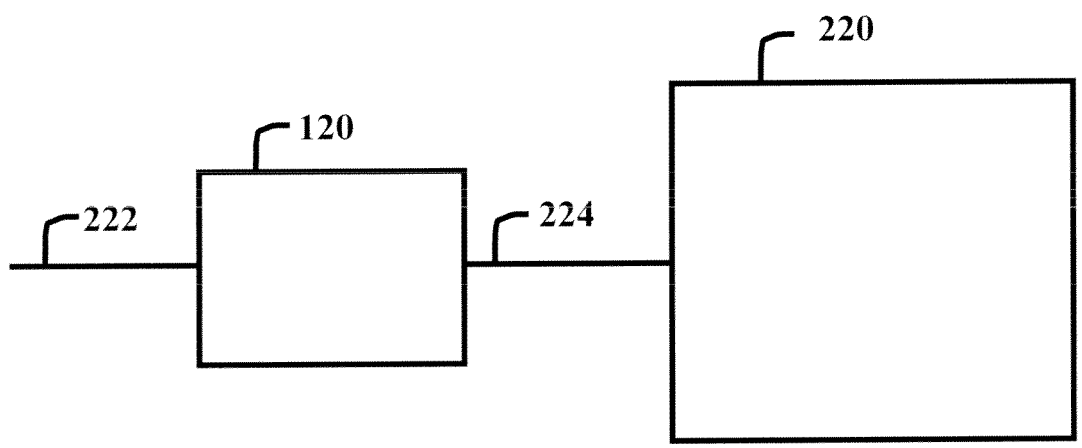
FIG. 2 illustrates a receiving device and a display in accordance with one embodiment of the present invention, wherein the receiving device is configured to display both auxiliary data and time-shifted data on the display.

As shown in FIG. 2, data is provided to the receiving device 120 via a first transmission path 222, where it is processed and provided to a display 220 via a second transmission path 220, which may include, for example, a coaxial cable, an HDMI cable, RCA cables, an Ethernet cable or other wireless means (e.g., WiFi, Bluetooth, etc.). It should be appreciated that the receiving device 120 is not limited to any particular type of receiving device, and includes all reception devices generally known to those skilled in the art (e.g., set-top boxes, satellite receivers, analog or digital cable boxes, etc.). It should also be appreciated that the first transmission path 222 is not limited to any particular type of transmission path, and includes all communication paths generally known to those skilled in the art (e.g., satellites, cables, fiber-optics, telephone lines, wide area networks, local area networks, wireless communication paths, etc.). It should further be appreciated that the display 220 is not limited to any particular type of display, and includes all display devices generally known to those skilled in the art (e.g., CRTs, LCDs, plasmas, projection devices, etc.). It should further be appreciated that the present invention is not limited a receiving device that is separate from a display. Thus, for example, a display that includes a receiving device is within the spirit and scope of the present invention.

In a preferred embodiment of the present invention, the receiving device 120 is configured to function as a DVR. In other words, the receiving device 120 is configured to perform both standard receiver functions (e.g., receiving data on a plurality of channels, processing data on a channel selected by a user (e.g., via a remote control), and providing the processed data to a display) and standard DVR functions (e.g., allowing a user to record, pause, rewind, fast forward and play processed data). It should be appreciated, however, that the present invention is not limited to a receiving device that incorporates a DVR, and that a receiving device that is in communication with an external (or remote) DVR (or other time-shifting device) is within the spirit and scope of the present invention.

The receiving device 120 may also be configured to add auxiliary data (e.g., advertisements, new tickers, "crawlers," etc.) to data that is being time-shifted, or data that has been recorded and is being played back (hereafter referred to as "time-shifted data"). In other words, at the time the time-shifted data is being played (e.g., in response to a request to play the time-shifted data, in response to the time-shifted data being played, in response to the time-shifted data being accessed from memory, etc.), the receiver is configured to acquire auxiliary data, and (at that time or a time thereafter) insert the auxiliary data into the time-shifted data, so that both the time-shifted data (or a portion thereof) and the auxiliary data (or a portion thereof) are displayed to the user on the display 220. By acquiring auxiliary data at (or around) the time the time-shifted data is being played, it is more likely that the auxiliary data has value to the user, thereby increasing the value of the time-shifted data to the content owner, the content provider and advertisers.

It should be appreciated that the term "time-shifted data," as used herein is not limited to data that is recorded and watched hours or days later. For example, most DVRs include a buffer, which buffers data that is being viewed in real-time. The buffer is used so that live data can be paused for a predetermined period of time (determined by the size of the buffer). However, pausing a program and then pressing "play," results in a program that is time-shifted, if only by a couple of seconds. Thus, depending on how the receiving device is programmed, it can treat all time-shifted data as "time-shifted data," or it can treat data that is shifted by a predetermined period of time (e.g., an hour, a day, a week, etc.) as "time-shifted data." It should also be appreciated that while "auxiliary data" is preferably current video data (e.g., "crawlers," news tickers, etc.) the present invention is not so limited. Thus, for example, inserting an auxiliary still image over time-shifted data (e.g., an advertiser's or content provider's logo (solid or semi-transparent), etc.), or playing auxiliary audio along with (or instead of) audio included in the time-shifted data is within the spirit and scope of the present invention.

It should further be appreciated that in different embodiments of the present invention, auxiliary data is displayed during either (a) the entire time the time-shifted data is displayed, or (b) a portion of the time the time-shifted data is displayed. For example, auxiliary data may be displayed shortly after the time-shifted data is displayed (e.g., giving the receiving device time to receive, process and/or store the auxiliary data). By way of another example, auxiliary data (e.g., a first set of auxiliary data) may be displayed while a first portion of the time-shifted data is displayed. Furthermore, a second set of auxiliary data may be displayed while a second portion of the time-shifted data is displayed, a third set of auxiliary data may be displayed while a third portion of the time-shifted data is displayed, etc. Alternatively, the first set of auxiliary data may be repeated (e.g., displayed while a third portion of the time-shifted data is displayed, etc.). It should further be appreciated that the auxiliary data can either be received in real-time (i.e., at or immediately before it is displayed), or received and stored, allowing it to be displayed at a later time (e.g., a minute later, a hour later, a day later, etc.).

Figure 3:
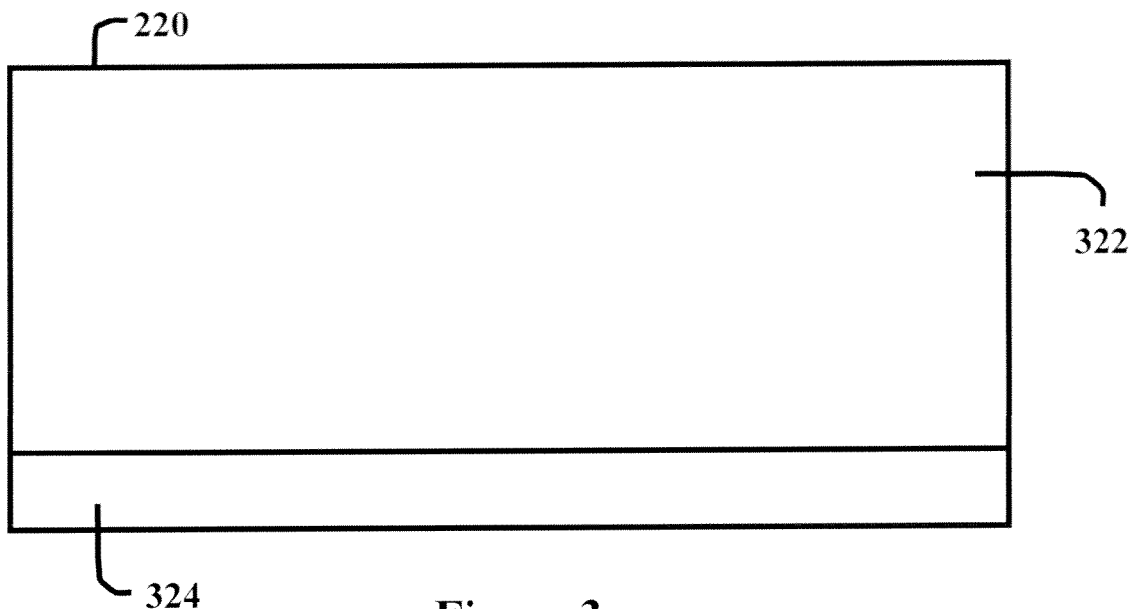
FIGS. 3 and 4 illustrate exemplary methods of displaying time-shifted and auxiliary data on the display.

FIG. 3 illustrates one way in which time-shifted data (or a portion thereof) and auxiliary data (or a portion thereof) can be displayed on the display 220. Specifically, the time-shifted data (e.g., a sporting event, a news program, a sitcom, a movie, etc.) may be displayed in a main portion 322 of the display 220, and the auxiliary data (e.g., an advertisement, a new ticker, a "crawler," etc.) may be displayed in an auxiliary portion 324 of the display. For example, in the case of a sitcom, the sitcom may be shown in the main portion 322, and auxiliary information, such as information on upcoming programs, late-breaking news, the content owner, the content provider or an advertiser, may be shown in the secondary portion 324. By way of another example, in the case of a sporting event, the sporting event may be shown in the main portion 322, and auxiliary information, such as information on other sporting events (e.g., scores, game updates, etc.) and an advertiser (or sponsor) of this information, may be shown in the secondary portion 324.

Figure 4:
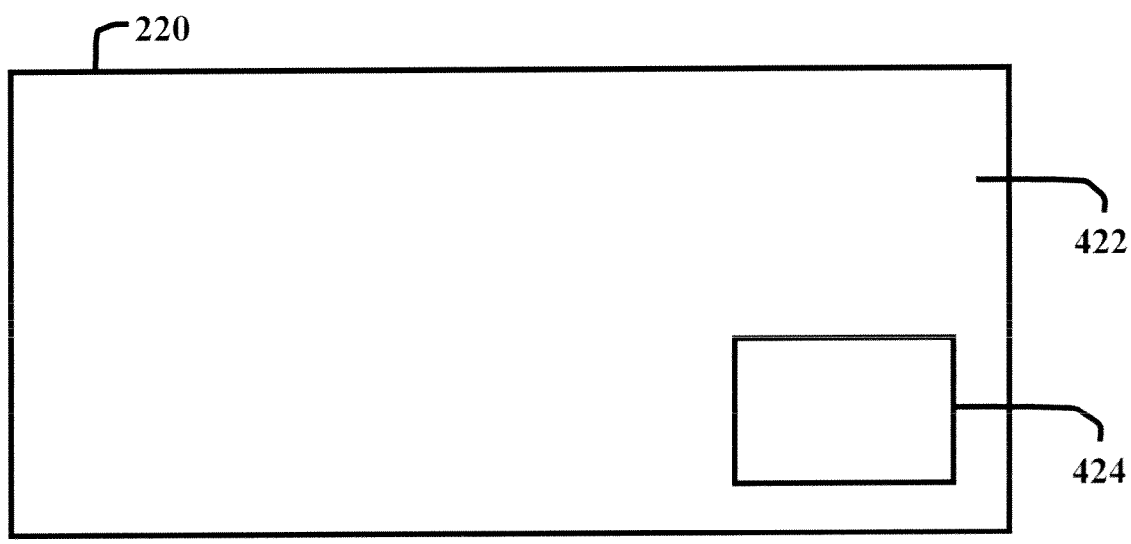

FIG. 4 illustrates another way in which time-shifted data (or a portion thereof) and auxiliary data (or a portion thereof) can be displayed on the display 220. Specifically, the time-shifted data may be displayed in a main portion 422 of the display 220, and auxiliary data may be displayed in an auxiliary portion 424 of the display 220. It should be appreciated that the present invention is not limited to displaying time-shifted data and auxiliary data as shown in FIGS. 3 and 4. Thus, for example, a method that displays auxiliary data on multiple portions of a display (regardless of each portion's size, location, etc.) is within the spirit and scope of the present invention. Further, as discussed below, a method that displays auxiliary data on the entire display is also within the spirit and scope of the present invention.

It should be appreciated that auxiliary data can be displayed inside the time-shifted data (e.g., similar to picture-in-picture, or PIP) or outside the time-shifted data (e.g., similar to picture-out-of-picture, or POP). In the case of the prior, the time-shifted data may be sized to fill the entire display, and the auxiliary data may be sized to fill only a portion of the display and either (a) blocks out time-shifted data in the auxiliary portion (e.g., similar to PIP, where you can only see the auxiliary data, and you cannot see the underlying time-shifted data), or (b) is semi-transparent, and does not block out all time-shifted data in the auxiliary portion (e.g., allows some of the underlying time-shifted data to be seen). In the case of the latter, the time-shifted data may be sized to fill a first portion of the display, and the auxiliary data may be sized to fill a second portion of the display. In one embodiment of the present invention, the time-shifted data and the auxiliary data can be combined to fill the entire display. For example, the time-shifted data may be sized for a 16:7 display, and the auxiliary data may be sized for a 16:2 display, thereby allowing the combined data to be sized for a 16:9 display. It should be appreciated, however, that it may be more convenient for time-shifted data to be sized for a 16:9 display, so that it can be easily displayed for those who are not time-shifting. For those who are time-shifting, auxiliary data can be added as a PIP, or the time-shifted data can be reformatted so that the auxiliary data can be added as a POP.

Figure 5:
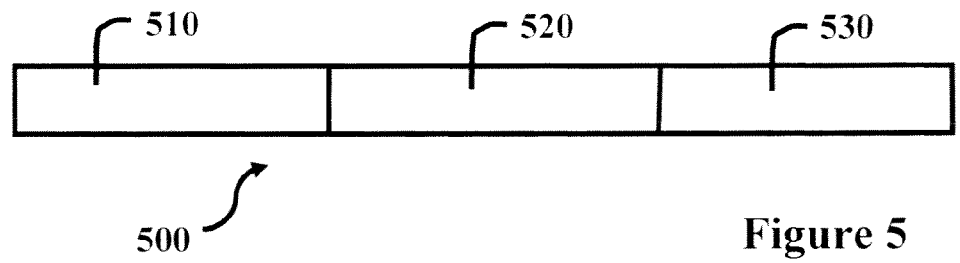
FIG. 5 illustrates time-shifted data that is divided into a plurality of segments, wherein auxiliary data is played between individual segments'.

In another embodiment of the present invention, the time-shifted data is broken down into a plurality of segments, and auxiliary data is added between the individual segments. For example, as shown in FIG. 5, time-shifted data 500, which may be a sitcom, is broken down into three segments 510. 520 and 530. The receiving device may be configured to store the segments separately, and play the first segment in response to a user (e.g., via a remote control) transmitting a command to play the time-shifted data. The receiving device may also be configured to receive auxiliary data when the first segment is played (e.g., in response to receiving the command to play the time-shifted data, in response to the first segment being played, in response to the first segment being over (or substantially over), in response to the first segment being accessed from memory, etc.), and to play the auxiliary data (e.g., a commercial, etc.) when the first segment is over. The receiving device would then play the second segment, followed by a second set of auxiliary data, followed by the third segment, etc.

By receiving the auxiliary data when (or shortly after) the time-shifted data has been played, advertisements that are played between segments can be tailored to the date and/or time the time-shifted data is played. As discussed further below, the advertisements can also be tailored to the user (e.g., using data kept by the content provider, data gathered by the receiving device, etc.). It should be appreciated that while it may be advantageous to receive auxiliary data as soon as time-shifted data is played (e.g., so that the data can be buffered and ready to be played), such a feature is not a limitation of the present invention. Thus, for example, receiving auxiliary data before the time-shifted data is played, or after portions of the time-shifted data are played, is within the spirit and scope of the present invention. By way of example only, the receiving device may be configured to receive auxiliary data in real-time, or when it is to be played (e.g., when the first segment is over, etc.).

Figure 6:
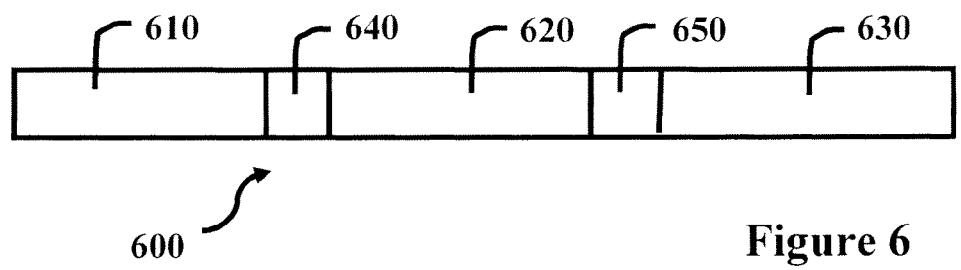
FIG. 6 illustrates time-shifted data that includes a plurality of commercial breaks, wherein auxiliary data is played during the commercial breaks.

In another embodiment of the present invention, the time-shifted data includes data on when commercials should be played. For example, as shown in FIG. 6, time-shifted data 600 may be stored as a single program that includes three segments 610, 620 and 630 and two commercial breaks 640, 650. In this embodiment, the time-shifted data comprises a plurality of data packets that includes (in part) information on the two commercial breaks 640, 650. This information may include, for example, when the commercial break begins, when the commercial break ends, the duration of the commercial break, etc. By doing this, the program can be aired (or broadcasted) with commercials, so that it can be watched (in its original form) by those who do not time-shift, and different commercial can be added to the program if the program is time-shifted. It should be appreciated that if the receiving device knows when commercials are to be played, or can differentiate between program data (or segments) and auxiliary data (or commercial breaks), then the receiving device could be configured to disable at least the fast forwarding feature of the DVR while commercials are being played. This would allow a user to time-shift data without being able to skip commercials. It should be appreciated that this embodiment of the present invention is not limited to time-shifted data that includes commercial breaks. For example, time-shifted data that includes at least one other break (e.g., an end (or remainder) of program data, updated information on program data, a sequel to program data, etc.).

Figure 7:
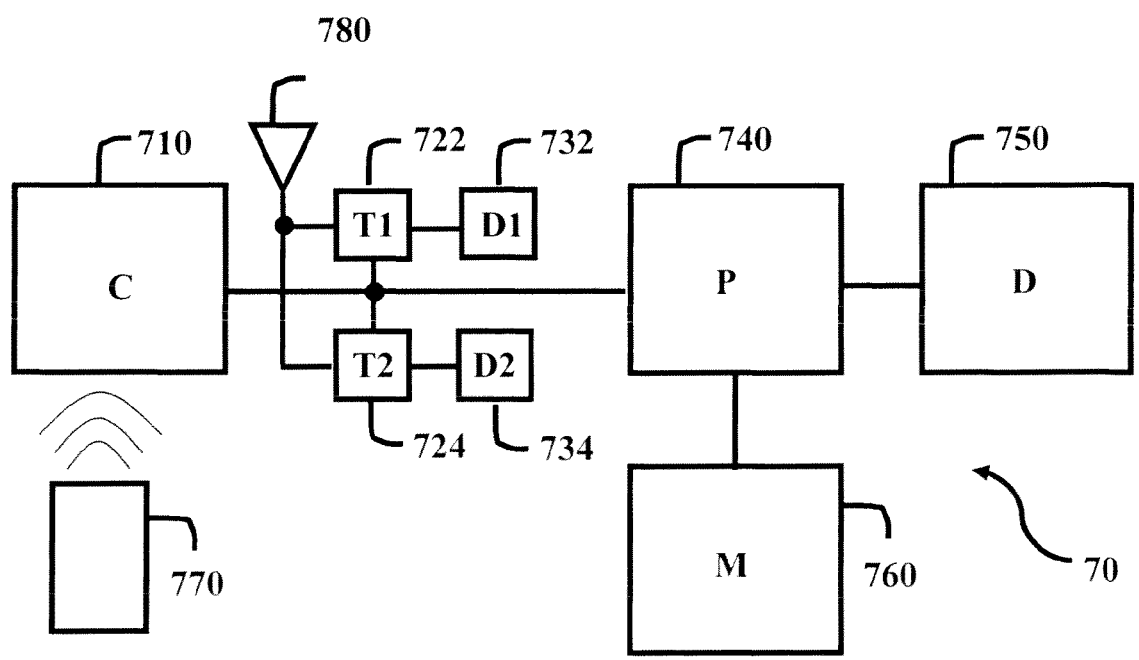
FIG. 7 illustrates a system for inserting auxiliary data into time-shifted data in accordance with one embodiment of the present invention.

FIG. 7 illustrates a system for adding auxiliary data to time-shifted data in accordance with one embodiment of the present invention. Specifically, the system 70 includes a controller 710 in communication with a remote control 770 (e.g., as operated by a user of the system), a processor 740 and a plurality of tuners 722, 724, wherein the tuners 722, 744 are configured to receive data on a plurality of channels from antenna 780, and to access data on a particular channel (or a particular frequency), as selected by either the controller 710 or the processor 740. For example, a user (via the remote control 770 and the controller 710) may select a particular channel to watch or record. By way of another example, the processor 740 may select a particular channel if it needs to acquire auxiliary data or program data that needs to be recorded (discussed in greater detail below).

Data received by the tuners 722, 724 is then provided to the decoders 732, 734, respectively, where the data is processed (e.g., amplified, decoded, de-packetized. etc.) and provided to the processor 740. The processed data can then either be displayed on the display 750 or stored in memory 760, so that it can be displayed at a future time. It should be appreciated that the present invention is not limited to the system shown in FIG. 7. First of all, FIG. 7 does not show every component included in a receiver/DVR. Those skilled in the art will understand that FIG. 7 shows key components, and that other (common) components are not shown for the sake of simplicity. For example, a receiver/DVR that further includes video amplifiers, audio amplifiers, analog-to-digital converters, multiplexors, additional processors (e.g., video processor, audio processor, PIP processor, etc.), fewer processors (e.g., combining the controller 710 and the processor 740, etc.), additional/fewer tuners, and additional/fewer memory devices is within the spirit and scope of the present invention.

It should also be appreciated that the memory shown in FIG. 7 is not limited to any particular type of memory, and all memory devices general known to those skilled in the art (e.g., hard drives, disk drives, RAM, ROM, etc.) are within the spirit and scope of the present invention. Further, the memory 760 may exist as a single memory, or as multiple memories locally and/or remotely located. For example, a first memory may be located inside the processor 740, a second memory may be external to the receiver/DVR, etc. It should further be appreciated that while FIG. 7 illustrates that data is received via antenna 780, the present invention is no so limited. As discussed above with respect to FIG. 1, data can be provided over any uni-directional or bi-directional data path, including, but not limited to satellites, cables, fiber-optics, telephone lines, wide area networks, local area networks and/or wireless data paths.

By way of example only, a user (via the remote control 770) may decide to record a sitcom that starts at 8:00 on channel 247 on Monday evening. The request would be provided to the processor 740 via the controller 710. At 8:00 on Monday evening, the processor 740 would set the tuner 722 to channel 247. The sitcom would then be retrieved, processed and stored in memory 760. A week later, the user (via the remote control 770) may decide to watch the sitcom, or time-shifted data. The request would be provided to the processor 740 via the controller 710. The processor 740 would then stream the time-shifted data to the display 750, so that it could be watched by the user. In the response to the request (or the like, as discussed above), the processor 740 would also acquire auxiliary data. The auxiliary data could be acquired from either the memory 760 (if previously received) or from the content owner or content provider (e.g., via antenna 780 or the like (e.g., satellite, cable, etc.)).

In one embodiment of the present invention, the processor 740 uses information included in the time-shifted data and/or linked to the time-shifted data (e.g., in memory) to acquire the auxiliary data. For example, the time-shifted data (or data linked thereto) may identify the channel that carried the time-shifted data. The processor 740 could then set the tuner 722 to this channel (e.g., 247) to receive the auxiliary data. In this embodiment, channel 247 is used to not only broadcast program data (e.g., sitcoms, sports, movies, etc.), but also to broadcast auxiliary data. However, if there is not enough bandwidth on channel 247 to broadcast both program and auxiliary data, then a different channel (e.g., channel 1247) could be used to broadcast auxiliary data for channel 247. The different channel could either be identified in the time-shifted data or in a look-up table, linking channel 247 to channel 1247. The look-up table, which could also link a program ID number or a time slot to a particular channel, could be stored in RAM or ROM in processor 740, or in memory 760.

Because auxiliary data may require less bandwidth, different types of auxiliary data could be carried on the same channel. For example, channel 1247 could carry auxiliary data for channel 247 and channel 248, auxiliary data for first program data and for second program data, auxiliary data for a first segment and for a second segment, etc., wherein each type of auxiliary data includes data that identify the channel, program or segment for which it pertains. For example, if the auxiliary data is provided in a plurality of packets, channel data (or data that could be used to determine channel data) (e.g., via a look-up table) could be include in at least one packet (e.g., in a packet's header, payload, etc.).

It should be appreciated that the processor 740 may be configured to set the secondary tuner 724 to the channel that includes the auxiliary data. This is done so that the primary tuner 722, which may be in use by the user (e.g., to buffer live television, to record another program, etc.), is left unchanged. In fact, in a preferred embodiment, the system would include a dedicated tuner that is not accessible to the user and used solely (or at least primarily) to acquire auxiliary data. It should also be appreciated that the processor may further be configured to add auxiliary data to program data, regardless of whether the program data is time-shifted. In other words, if program data is being viewed in real-time (i.e., not time-shifted), then the processor could be used to add auxiliary data (retrieved in real-time) to the program data (retrieved in real-time). Such an embodiment could be used to display, for example, a sitcom and a news ticker, both of which are broadcasted at substantially the same time. Such an embodiment could also be used to display, for example, first and second program data, both of which are broadcasted at substantially the same time, and can be displayed together to create (together with proper glasses) a 3D affect. If, however, the program data is time-shifted, then the processor could be used to add auxiliary data (retrieved in response to playing the previously recorded program data) to the program data (previously recorded).

The foregoing embodiment is well suited for a uni-directional network, such as satellite. However, in a bi-directional network, such as cable, fiber-optics, wide area network, local area network, or satellite with a return system (e.g., phone line, satellite transmitter, etc.), the auxiliary data could be requested from a content provider or a content owner. For example, the time-shifted data could include self-identifying information (e.g., ID number), which could be provided (e.g., together with date and/or time) to the content provider or content owner, requesting the auxiliary data. This would allow the auxiliary data (which could be provided in a response to the request, over a channel identified in a response to the request, over a channel identified in a look-up table, etc.) to be tailored to not only the time and/or date of playback of the time-shifted data, but to the time-shifted data itself. For example, auxiliary data for a soap opera may be different than auxiliary data for a sporting event, even if both are being played back at the same time. In such a system, additional data could also be used to tailor the auxiliary data to the user. For example, the content provider may have demographic data on the user, and the processor 740 may have information on his/her viewing habits (e.g., programs that have been recorded, programs that have been viewed, etc.). This information, together with the type of time-shifted data, and the time and/or day it is being played, could be used to tailor auxiliary data specifically for the user.

Regardless of the particular method used to acquire auxiliary data (e.g., acquiring it from the same channel that carried the program data, acquiring it from a different channel, sending a request for auxiliary data, etc.), a program may be stored on the receiver (e.g., in memory in the processor 740, in the memory 760, etc.) to perform the functions of acquiring and displaying auxiliary data without any intervention from the user. For example, in response to the user pressing the "play" button on the remote control 770, the processor 740 would not only function to play the time-shifted data, but also to automatically acquire auxiliary data (which may require changing the channel of the primary tuner 722, changing the channel of the secondary tuner 724, sending a request to the content provider, etc.) and to automatically display (at an appropriate time) the auxiliary data on the display 750. Preferably, this should be done without any user intervention, so that the process is seamless to the user. That being said, a user may be able to program the receiver/DVR (e.g., during set-up) to enable/disable the receiving and/or displaying of auxiliary data (or a portion thereof). For example, a user who is recording a first sporting event and watching a second sporting event, either in real-time or time-shifted, may not want to receive updates (e.g., in the form of a news ticker) on the first sporting event. Thus, a user may be able to program the processor 740 to display only program data, and not auxiliary data, or filter the auxiliary data so that only certain information is displayed, or certain information is not displayed.

In one embodiment of the present invention, the processor 740 is configured to display auxiliary data only when the time-shifted data is being played, and not when the time-shifted data is in rewind or fast forward. In other words, if the user enters a command (via the remote control 770) to rewind the time-shifted data, so that the time-shifted data is shown on the display 750 going backwards, or enters a command to fast forward the time-shifted data, so that the time-shifted data is shown on the display 750 going forwards, the auxiliary data is not displayed during these times. It is only displayed when the time-shifted data is being played, in a forward direction, and at a normal (or original) speed.

In another embodiment of the present invention, the processor 740 is further configured to display auxiliary data when the time-shifted data is in rewind. In other words, if the user enters a command to rewind the time-shifted data, so that the time-shifted data is shown on the display 750 going backwards, the processor 740 displays the auxiliary data during this time. In accordance with this embodiment, the processor 740 may be configured to buffer the time-shifted data and the auxiliary data (together) so that the rewind command can be used to play both the time-shifted data and the auxiliary data (together) in reverse. For example, if the time-shifted data is a sitcom, and the auxiliary data is a transparent logo for Pepsi™, and the user enters a command to play the sitcom, then the processor 740 may be configured to display (or play) the sitcom on the display 750 along with the Pepsi™ logo. The processor 740 may then buffer (or store) (e.g., in memory 760) the played portions of the sitcom with the Pepsi™ logo, allowing the processor 740 to play (from the buffer) the sitcom in reverse together with the Pepsi™ logo if the user enters a rewind command. This would also allow the processor 740 to pause the data (together), and then play the data (together). Preferably, the buffered data should be stored separate from the time-shifted data, so that the time-shifted data (or a portion thereof) can be played at a later time with different auxiliary data.

In another embodiment of the present invention, the processor 740 is further configured to display auxiliary data when the time-shifted data is in fast forward. In other words, if the user enters a command to fast forward the time-shifted data, so that the time-shifted data is shown on the display 750 going forward, the processor 740 displays the auxiliary data during this time. It should be appreciated that in order to do this, the auxiliary data needs to be received, or stored, prior to (or immediately after) the time-shifted data is played. For example, in the prior instance of a sitcom and a Pepsi™ logo, because the logo does not change during playback, the processor 740 can add the logo to the time-shifted data regardless of whether the data is being played in reverse, or fast forward. By way of another example, if the auxiliary data is received before the time-shifted data is played, then the processor 740, in response to a fast forward command, could display the time-shifted data going forward together with the auxiliary data going forward. In other words, both sets of data could be displayed (together) while they are being fast forwarded. In this example, the processor 740 could be configured to receive and store auxiliary data for the time-shifted data stored in the memory 760 (e.g., once a week, once a day, once an hour, etc.) in anticipation that the time-shifted data may be played. By way of another example, the processor could be configured to download auxiliary data (e.g., as a chunk of data) at the time the time-shifted data is being played. The downloaded data can then be processed (e.g., unzipped, decompressed, etc.) and played together with the time-shifted data (or a portion thereof).

It should be appreciated that in one embodiment of the present invention, the memory 760, or a portion thereof, may be remotely located from the processor 740 (e.g., at the content provider, etc.). In such a system, program data could be stored remotely from the processor 740, and requested by the user (e.g., like an on-demand video system). As with other embodiments of the present invention, the program data (as stored) could be accessed by the processor 740 and played on the display 750. During play, the processor 740 could also be configured to access auxiliary data, and display the auxiliary data together with the program data on the display 750.

Figure 8:
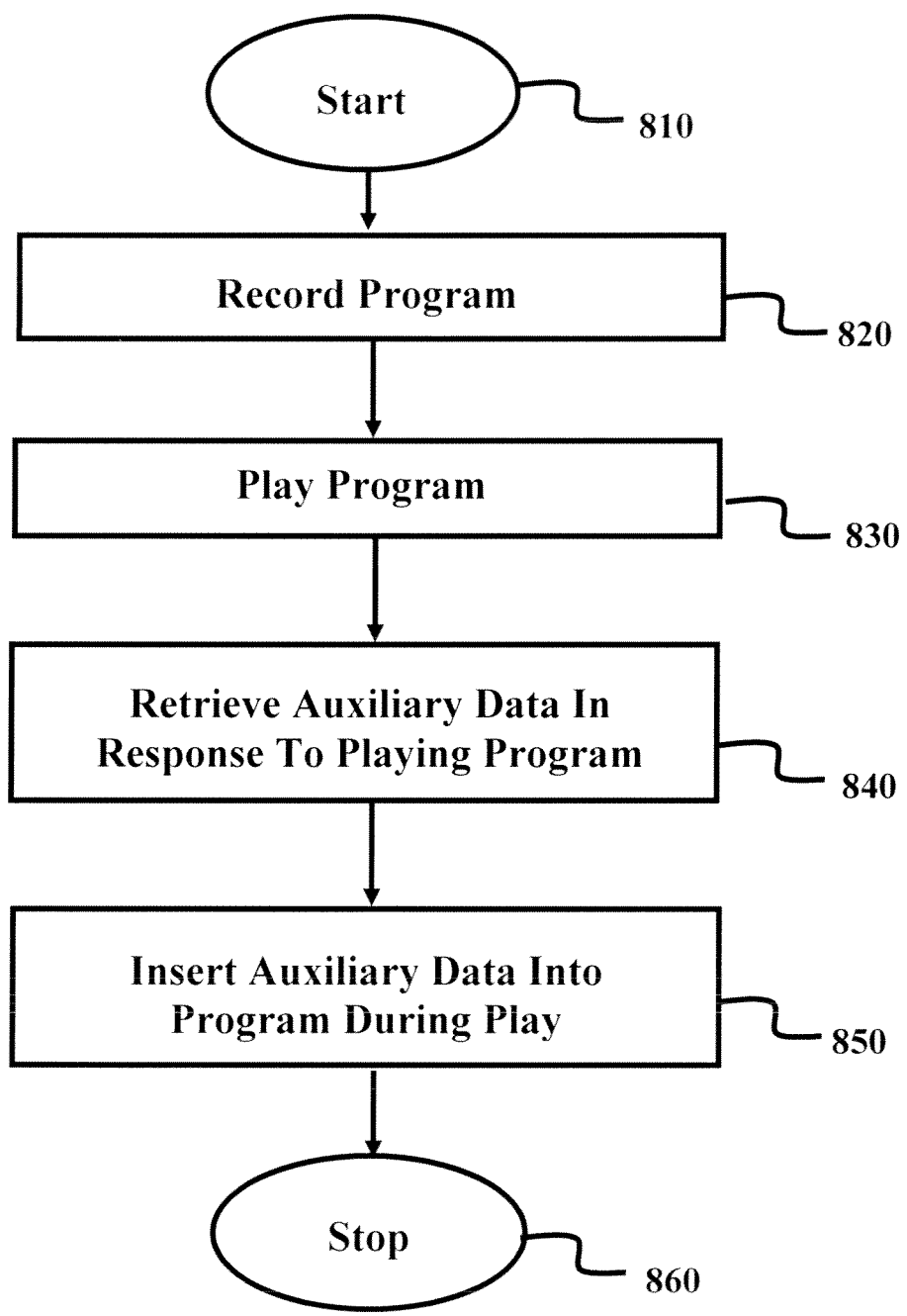
FIG. 8 illustrates a method for inserting auxiliary data into time-shifted data in accordance with one embodiment of the present invention.

FIG. 8 illustrates a method of adding auxiliary data to time-shifted data. Specifically, the method, which starts at step 810, involves recording program data at step 820. When the program data is played at step 830, auxiliary data is retrieved at step 840. This can be, for example, in response to a request to play the program data, in response to accessing program data from memory, in response to playing program data, in response to the program data being substantially over, etc. At step 850, both auxiliary data and program data are played at the same time on the display (e.g., as PIP, POP, etc.). In an alternate embodiment, the program data is split into a plurality of segments, and auxiliary data is played between segments. The playing of both program data and auxiliary data (either consecutively or concurrently) continues until the program data is over, ending the method at step 860.

Having thus described multiple embodiments of a system and method for inserting auxiliary data into time-shifted data, it should be apparent to those skilled in the art that certain advantages of the system have been achieved. It should also be appreciated that various modifications, adaptations, and alternative embodiments thereof may be made within the scope and spirit of the present invention. For example, in certain embodiments of the invention, it is described that a processor is used to display both auxiliary and time-shifted data. It should be appreciated that the processor may also (or instead) initiate the display of auxiliary and/or time-shifted data by controlling (or providing data to) another device (e.g., a multiplexor, a mixer, an adder, a multiplier, another processor (e.g., PIP processor, video processor, etc.), video memory, etc.). The invention is further defined by the following claims.

What is claimed is:

1. A digital video recorder ("DVR") for time shifting at least a portion of a transmitted video program, comprising:
   a tuner for receiving said video program as transmitted, said video program including at least first, second and third portions, wherein said second portion as transmitted is configured to follow said first portion, and said third portion as transmitted is configured to follow said second portion;
   a memory device for storing said video program, allowing at least a portion of said video program to be played back at a later time;
   a controller configured to receive commands from a user of said DVR, wherein a first command changes said DVR from a first playback state to a second playback state, and a second command initiates playback of said video program from said memory device; and
   at least one processor configured to (i) provide said video program in its entirety to a display device in response to receiving said second command regardless of a playback state of said DVR if said second command is received during a first period of time, (ii) provide said video program in its entirety to said display device in response to receiving said second command if said second command is received during a second period of time and said DVR is in said first playback state, and (iii) provide only a portion of said video program to said display device in response to receiving said second command if said second command is received during said second period of time and said DVR is in said second playback state, said portion of said video program including at least said first and third portions of said video program, wherein said third portion of said video program is provided to said display device immediately following said first portion of said video program if said second command is received during said second period of time and said DVR is in said second playback state;
   wherein said second period of time is a period of time after said first period of time.

2. The DVR of claim 1, wherein said controller is configured to receive said commands from a remote control operated by said user of said DVR.

3. The DVR of claim 1, wherein said video program includes at least primary and secondary video content, and said portion of said video program that is provided to said to said display device if said second command is received during said second period of time and said DVR is in said second playback state includes said primary video content and only a portion of said secondary video content.

4. The DVR of claim 1, wherein said video program includes at least primary and secondary video content, and said portion of said video program that is provided to said to said display device if said second command is received during said second period of time and said DVR is in said second playback state includes only said primary video content.

5. The DVR of claim 4, wherein said memory device is further configured to store at least one time when said secondary video content begins and at least one time when said secondary video content ends.

6. The DVR of claim 1, wherein said first period of time is a period of time that is less than one week from said transmission of said video program, and said second period of time is any time after said first period of time.

7. The DVR of claim 4, wherein said secondary video content comprises at least one advertisement.

8. The DVR of claim 1, wherein said at least one processor is further configured to (i) retrieve said portion of said video program from said memory device if said second command is received during said second period of time and said DVR is in said second playback state, and (ii) retrieve said video program in its entirety from said memory device if another second command is received at a time thereafter and said DVR is switched to said first playback state at or before said time thereafter.

9. A method for time shifting at least a portion of a video program transmitted to a digital video recorder ("DVR"), comprising:
   receiving said video program, said video program including at least first, second and third portions, wherein said second portion as transmitted is configured to follow said first portion, and said third portion as transmitted is configured to follow said second portion;
   storing said video program on a memory device in said DVR;
   receiving a first command from at least one user of said DVR, said first command indicating a playback state of said DVR;
   receiving a second command from said at least one user of said DVR, said second command indicating a desire to playback at least a portion of said video program; and providing said at least a portion of said video program to a display device in response to receiving said second command;

wherein said step of providing said at least a portion of said video program to said display device further comprises (i) providing said video program to said display device in response to receiving said second command regardless of a playback state of said DVR if said second command is received during a first period of time, (ii) providing said video program to said display device in response to receiving said second command if said second command is received during a second period of time and said DVR is in said first playback state, and (iii) providing only a portion of said video program to said display device in response to receiving said second command if said second command is received during said second period of time and said DVR is in said second playback state, said portion of said video program including at least said first and second portions of said video program, wherein said third portion of said video program is provided to said display device immediately following said first portion of said video program if said second command is received during said second period of time and said DVR is in said second playback state;

wherein said second period of time is a period of time after said first period of time.

10. The method of claim 9, wherein said step of receiving said video program further comprises receiving said video program from a satellite via an antenna.

11. The method of claim 9, wherein said step of storing said video program on said memory device in said DVR further comprises storing at least one time of when said second portion of said video program begins and at least one time of when said second portion of said video program ends, wherein said portion of said video program provided during said second time and when said DVR is in said second playback state does not include at least said second portion.

12. The method of claim 9, wherein said video program includes at least primary and secondary video content, and said portion of said video program that is provided to said display device if said second command is received during said second period of time and said DVR is in said second playback state includes said primary video content and only a portion of said secondary video content.

13. The method of claim 9, wherein said video program includes at least primary and secondary video content, and said portion of said video program that is provided to said display device if said second command is received during said second period of time and said DVR is in said second playback state includes only said primary video content.

14. The method of claim 9, wherein said first period of time is a first day after said video program has been transmitted, and said second period of time is a time period thereafter.

15. The method of claim 9, wherein said first period of time is a period of time that is less than one week from said transmission of said video program, and said second period of time is a time period after said first period of time.

16. The method of claim 13, wherein said secondary video content is at least one advertisement.

17. The method of claim 11, wherein said step of receiving said video program further comprises receiving said video program, said at least one time of when said second portion of said video program begins, and said at least one time of when said second portion of said video program ends from a satellite, wherein each one of said at least one times is received by said DVR after said video program is stored on said memory device.

18. A digital video recorder ("DVR") for time shifting at least a first portion of a video program, said first portion of said video program consists of first, second and third portions, wherein said second portion as transmitted is configured to follow said first portion, and said third portion as transmitted is configured to follow said second portion, comprising:

a tuner for receiving said video program;
a memory device for storing said video program;
a controller for receiving commands including at least a first command for setting a playback state of said DVR and a second command for initiating a playback of said video program from said memory device; and
at least one processor for (i) providing said first portion of said video program in its entirety to a display device in response to receiving said second command during a first period of time, (ii) providing said first portion of said video program in its entirety to said display device in response to receiving said second command during a second period of time if said DVR is in a first playback state, and (iii) providing only said first and third portions of said video program to said display device in response to receiving said second command during said second period of time if said DVR is in a second playback state, wherein said third portion of said video program is provided to said display device immediately following said first portion of said video program if said second command is received during said second period of time and said DVR is in said second playback state.

19. The method of claim 18, wherein said first and third portions of said video program include primary content and said second portion includes secondary content.

* * * * *